United States Patent
Fu et al.

(10) Patent No.: US 11,650,413 B2
(45) Date of Patent: May 16, 2023

(54) BEAM SCANNING APPARATUS WITH ARRAYED ROTATING MIRRORS

(71) Applicant: HUAWEI TECHNOLOGIES CO., LTD., Shenzhen (CN)

(72) Inventors: Liding Fu, Beijing (CN); Guangyuan Shi, Wuhan (CN); Song Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 443 days.

(21) Appl. No.: 16/895,792

(22) Filed: Jun. 8, 2020

(65) Prior Publication Data

US 2020/0301132 A1    Sep. 24, 2020

Related U.S. Application Data

(63) Continuation of application No. PCT/CN2018/119109, filed on Dec. 4, 2018.

(30) Foreign Application Priority Data

Dec. 8, 2017   (CN) .......................... 201711294524.6

(51) Int. Cl.
  *G02B 26/12*    (2006.01)
  *G02B 7/182*    (2021.01)
(52) U.S. Cl.
  CPC ......... *G02B 26/121* (2013.01); *G02B 7/1821* (2013.01); *G02B 26/127* (2013.01)

(58) Field of Classification Search
  USPC .......... 359/200.1, 212.1–212.2, 216.1–217.4
  See application file for complete search history.

(56) References Cited

U.S. PATENT DOCUMENTS

| | | | | |
|---|---|---|---|---|
| 1,256,645 | A * | 2/1918 | Barnett | ................. G09F 11/025 40/505 |
| 4,525,749 | A | 6/1985 | Maeda et al. | |
| 2002/0075786 | A1 | 6/2002 | Ikegame | |
| 2012/0319445 | A1* | 12/2012 | Zolno | ................. B60N 2/0232 74/665 F |

(Continued)

FOREIGN PATENT DOCUMENTS

| | | |
|---|---|---|
| CN | 102759736 A | 10/2012 |
| CN | 103543526 A | 1/2014 |
| CN | 103576209 A | 2/2014 |

(Continued)

*Primary Examiner* — Jennifer D. Carruth
(74) *Attorney, Agent, or Firm* — Leydig, Voit & Mayer, Ltd.

(57) ABSTRACT

A beam scanning apparatus with arrayed rotating mirrors is provided. The beam scanning apparatus includes a motor, a worm, a wormgear, a mounting rack, and a rotating mirror, where the worm and the wormgear are located on the mounting rack, and engage with each other by using a gear for a linkage connection; the rotating mirror is located in the mounting rack, and is coaxially connected to the wormgear; and the motor is configured to drive the worm to rotate, to drive the wormgear and the rotating mirror to rotate coaxially. The rotating mirror may be replaced with another rotating mirror with a different structure and a different optical parameter, to adjust output performance of the beam scanning apparatus, thereby improving extensibility.

15 Claims, 5 Drawing Sheets

(56) References Cited

U.S. PATENT DOCUMENTS

2015/0293224 A1 10/2015 Eldada et al.
2015/0349237 A1 12/2015 Aimono

FOREIGN PATENT DOCUMENTS

| | | |
|---|---|---|
| CN | 105043541 A | 11/2015 |
| CN | 105292508 A | 2/2016 |
| CN | 206200343 U | 5/2017 |
| CN | 108227181 A | 6/2018 |
| EP | 0588605 A1 | 3/1994 |
| EP | 1641242 A2 | 3/2006 |
| EP | 2333603 A1 | 6/2011 |

* cited by examiner

BEAM SCANNING APPARATUS WITH ARRAYED ROTATING MIRRORS

CROSS-REFERENCE TO RELATED APPLICATIONS

This application is a continuation of International Application No. PCT/CN2018/119109, filed on Dec. 4, 2018, which claims priority to Chinese Patent Application No. 201711294524.6, filed on Dec. 8, 2017. The disclosures of the aforementioned applications are hereby incorporated by reference in their entireties.

TECHNICAL FIELD

Embodiments of this application relate to the artificial intelligence field, and more specifically, to a beam scanning apparatus with arrayed rotating mirrors.

BACKGROUND

With emergence of self-driving vehicles and intelligent robots, as a core sensor, a lidar has increasingly high requirements on performance, costs, a volume, and power consumption. Conventional mechanical beam scanning devices are gradually replaced due to disadvantages such as a large volume, high power consumption, and high costs. In recent years, conceptual machines of solid-state lidars or hybrid solid-state lidars emerge several times. Although no reliable test data has been published, this already indicates a future development direction of the lidar.

A lidar in the prior art implements beam scanning by using an optical phased array technology, a maximum scanning angle can reach 60°, and the optical phased array technology is a beam scanning technology without any mechanical or micro-mechanical structure. This technology has the following disadvantages: 1. A laser transmitter module and a signal receiving module in a system operate independently, and only the transmitter module performs scanning but the signal receiving portion does not perform scanning. Consequently, synchronous scanning cannot be performed. Therefore, a detection angle of view of the signal receiving module needs to be increased by using an APD detector array in the system, resulting in excessively high costs of the signal receiving module. 2. The optical phased array technology has very high requirements on a photonic integration technology and a phased array control algorithm. Currently, this technology is still at a lab stage. A detection range of a hybrid solid-state lidar based on a digital MEMS mirror in the prior art reaches 250 meters with angular resolution of 0.1°. Some mechanical structures remain in the hybrid solid-state lidar, but the mechanical structures are miniaturized, and an internal mechanical moving part is hidden after packaging. The MEMS mirror has the following disadvantages: 1. A scanning angle is relatively small, and linear motion with relatively high precision can be kept only within a range of 0° to 6°. 2. The micro vibration mirror has a tiny size, which generally ranges from 1 mm to 3 mm; and the micro vibration mirror can be used only in coordination with a complex optical system.

In addition, a plurality of solid state technologies such as acousto-optic crystal scanning, liquid crystal scanning, and ceramic piezoelectric crystal electro-optical scanning further exist. However, all these technologies have disadvantages such as an excessively small scanning angle, a low response speed, and high costs. Therefore, these technologies are inapplicable to the field of self-driving vehicles or intelligent mechanics.

SUMMARY

Embodiments of this application provide a beam scanning apparatus with arrayed rotating mirrors. In the beam scanning apparatus with arrayed rotating mirrors, a reflecting mirror is used as a scanning mirror, and the scanning mirror is decomposed into a plurality of rotating sub-mirrors, namely, a plurality of rotating mirrors (5), to form a transmission structure in which the plurality of rotating mirrors (5) operate in a linkage manner. In addition, a structure of another part of the scanning apparatus is disposed accordingly relative to the rotating mirrors (5). This overcomes disadvantages such as an excessively small scanning angle, a large occupied space, and high power consumption of a lidar in the prior art, and achieves effects of a small volume, low power consumption, a large scanning angle of view, high precision, and a simple structure at the same time. Therefore, the beam scanning apparatus with arrayed rotating mirrors is especially suitable for a lidar system having requirements on low costs and miniaturization.

An embodiment of this application provides a beam scanning apparatus with arrayed rotating mirrors, including: a motor (1), a worm (2), a wormgear (3), a mounting rack (4), and a rotating mirror (5), where the worm (2) and the wormgear (3) are located on the mounting rack (4), and engage with each other by using a gear (11) for a linkage connection;

the rotating mirror (5) is located in the mounting rack (4), and is coaxially connected to the wormgear (3);

the motor (1) is configured to drive the worm (2) to rotate, to drive the wormgear (3) and the rotating mirror (5) to rotate coaxially; and the rotating mirror (5) includes a rotating mirror portion (5c) and rotating mirror bases (5a and 5b) that are respectively connected to two ends of the rotating mirror portion (5c), bearings (6a and 6b) that are rotatably connected to the mounting rack (4) are respectively disposed on the two rotating mirror bases (5a and 5b) and extend outward from two ends of the rotating mirror, and one of the bearings (6a) is coaxially connected to the wormgear (3).

Beneficial effects are as follows: In the beam scanning apparatus with arrayed rotating mirrors in this embodiment of this application, a reflecting mirror is used as a scanning mirror, and the scanning mirror is decomposed into a plurality of rotating sub-mirrors, namely, a plurality of rotating mirrors (5), to form a transmission structure in which the plurality of rotating mirrors (5) operate in a linkage manner. In addition, a structure of another part of the beam scanning apparatus is disposed accordingly relative to the rotating mirrors (5). This achieves features such as a high scanning speed, a large angle of view, high precision, and a simple structure at the same time. Therefore, the beam scanning apparatus with arrayed rotating mirrors is especially suitable for a lidar system having requirements on low costs and miniaturization. A scanning angle of the apparatus can reach at least 60° or at least 100°, thereby effectively increasing a beam scanning range.

In this embodiment of this application, a structure of the beam scanning apparatus with arrayed rotating mirrors is disposed, to greatly reduce a volume of the beam scanning apparatus with arrayed rotating mirrors, thereby improving space utilization of the entire system and reducing power consumption and noise. This overcomes disadvantages such as an excessively small scanning angle, a low response speed, high costs, a large volume, and high power consumption of a beam scanning apparatus in the prior art, and achieves features such as a high scanning speed, a large angle of view, high precision, a simple structure, a small volume, and low power consumption at the same time. Particularly, the volume of the beam scanning apparatus with arrayed rotating mirrors is greatly reduced, so that the beam scanning apparatus with arrayed rotating mirrors has an outstanding advantage in the small volume over mainstream products on the market.

In another implementation of this application, a beam scanning apparatus with arrayed rotating mirrors is provided, including a motor (1), at least one set of rotating mirror (5), a rotating mirror base (5b), at least one set of bearing (6), an angle encoder (7), a base (8), a synchronous pulley (14), and a synchronous belt (15), where the motor (1) is coaxial with the one set of bearing (6) and drives the one set of bearing (6) to rotate, the synchronous pulley (14) is disposed on each set of bearing (6), and the bearings (6) are connected by using the synchronous belt (15), so that the sets of bearings (6) rotate synchronously;

one rotating mirror base (5b) is disposed on one end of each set of rotating mirror (5), and the rotating mirror base (5b) is connected to one set of bearing (6), so that the sets of bearings (6) respectively drive the sets of rotating mirrors (5) to rotate;

the base (8) is disposed between the motor (1) and the rotating mirror base (5b), and an opening is provided on the base (8), so that each set of bearing (6) is embedded in the base (8); and the angle encoder (7) is disposed on one of the sets of bearings (6).

Figure 1:
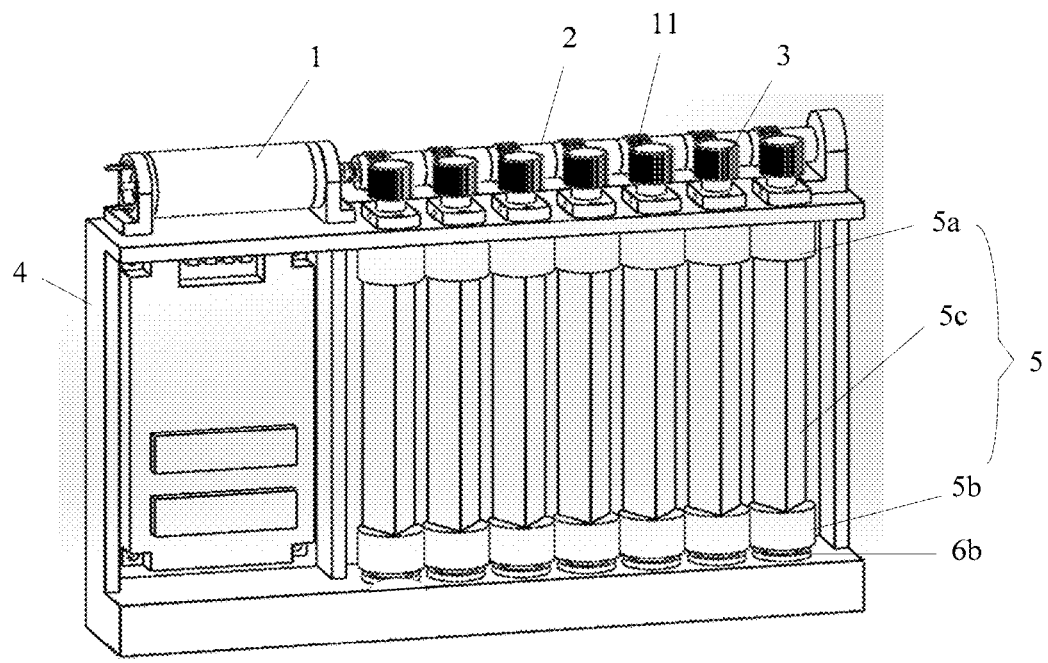
FIG. 1 is an overall schematic structural diagram of a beam scanning apparatus with arrayed rotating mirrors according to an embodiment of this application.

Description of reference numerals: 1: motor; 2: worm; 3: wormgear; 4: mounting rack; 5: rotating mirror; 5a and 5b: rotating mirror bases; 5c: rotating mirror portion; 6, 6a, and 6b: bearings; 7: angle encoder; 8: base; 9: power supply; 10: coupling; 11: gear; 12: slab; 13: column; 14: synchronous pulley; and 15: synchronous belt.

DESCRIPTION OF EMBODIMENTS

The following clearly describes the technical solutions in the embodiments of this application with reference to the accompanying drawings in the embodiments of this application.

FIG. 1 shows a beam scanning apparatus with arrayed rotating mirrors in some embodiments of this application. The beam scanning apparatus may be applied to an intelligent scanning scenario of an intelligent device such as intelligent driving and an intelligent robot. When the beam scanning apparatus with arrayed rotating mirrors is applied to a vehicle, the beam scanning apparatus with arrayed rotating mirrors is disposed on a vehicle roof, a bumper, or a vehicle windshield of the vehicle. The beam scanning apparatus with arrayed rotating mirrors is used in coordination with other parts such as a laser transmitter and a signal receiver of a laser detection apparatus on the vehicle. The laser transmitter transmits a laser to a rotating mirror (5) of the beam scanning apparatus with arrayed rotating mirrors, the rotating mirror (5) reflects or refracts the laser to an obstacle in a scenario that needs to be scanned, and then the rotating mirror (5) reflects or refracts, to the signal receiver, a laser reflected back by an object in the scanned scenario. As a signal light source, the laser transmitter radiates a measurement signal afar. The signal receiver receives reflected light by using a built-in signal receiving unit and generates an echo signal. Then, a control unit on the vehicle processes the echo signal.

The beam scanning apparatus with arrayed rotating mirrors includes a motor (1), a worm (2), a wormgear (3), a mounting rack (4), and the rotating mirror (5). The worm (2) and the wormgear (3) are located on the mounting rack (4), and engage with each other by using a gear (11) for a linkage connection; the rotating mirror (5) is located in the mounting rack (4), and is coaxially connected to the wormgear (3); the motor (1) is configured to drive the worm (2) to rotate, to drive the wormgear (3) and the rotating mirror (5) to rotate coaxially; and the rotating mirror (5) includes a rotating mirror portion (5c) and rotating mirror bases (5a and 5b) that are respectively connected to two ends of the rotating mirror portion (5c), bearings (6a and 6b) that are rotatably connected to the mounting rack (4) are respectively disposed on the two rotating mirror bases (5a and 5b) and extend outward from two ends of the rotating mirror, and one of the bearings (6a) is coaxially connected to the wormgear (3). There are at least two sets of rotating mirrors (5), and seven sets of rotating mirrors (5) are shown in FIG. 1 as an example.

Beneficial effects are as follows: In the beam scanning apparatus with arrayed rotating mirrors in this embodiment of this application, a reflecting mirror is used as a scanning mirror, and the scanning mirror is decomposed into a plurality of rotating sub-mirrors, namely, a plurality of rotating mirrors (5), to form a transmission structure in which the plurality of rotating mirrors (5) operate in a linkage manner. In addition, a structure of another part of the beam scanning apparatus is disposed accordingly relative to the rotating mirrors (5). This achieves features such as a high scanning speed, a large angle of view, high precision, and a simple structure at the same time. Therefore, the beam scanning apparatus with arrayed rotating mirrors is especially suitable for a lidar system having requirements on low costs and miniaturization. A scanning angle of the apparatus can reach at least 60° or at least 100°, thereby effectively increasing a beam scanning range.

In this embodiment of this application, a structure of the beam scanning apparatus with arrayed rotating mirrors is disposed, to greatly reduce a volume of the beam scanning apparatus with arrayed rotating mirrors, thereby improving space utilization of the entire system and reducing power consumption and noise. This overcomes disadvantages such as an excessively small scanning angle, a low response speed, high costs, a large volume, and high power consumption of a beam scanning apparatus in the prior art, and achieves features such as a high scanning speed, a large angle of view, high precision, a simple structure, a small volume, and low power consumption at the same time. Particularly, the volume of the beam scanning apparatus with arrayed rotating mirrors is greatly reduced, so that the beam scanning apparatus with arrayed rotating mirrors has an outstanding advantage in the small volume over existing mainstream products.

Figure 2:
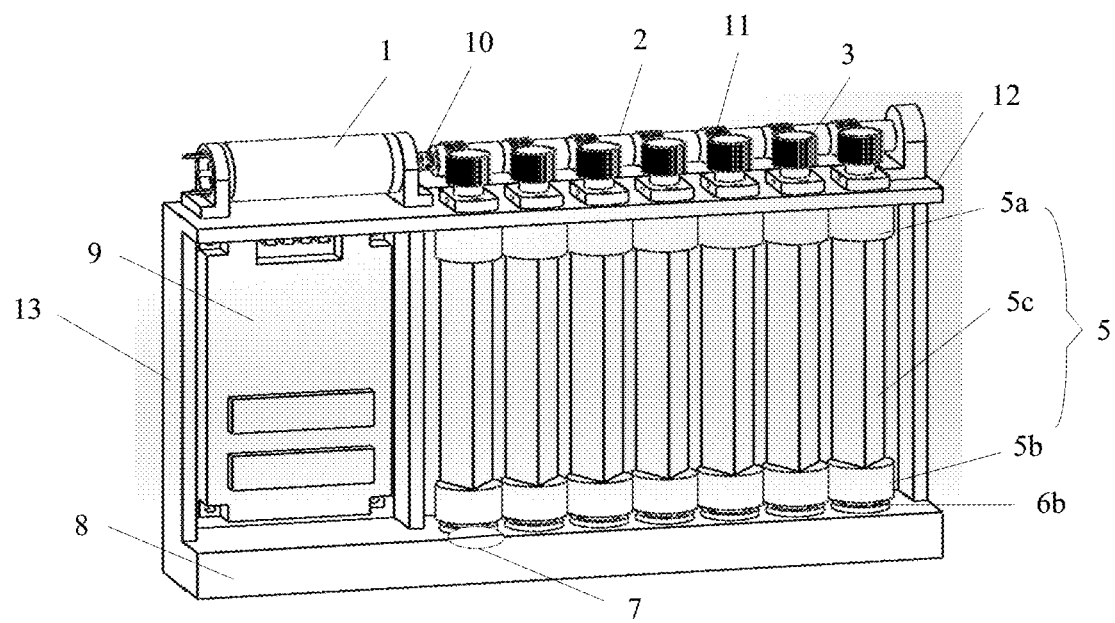
FIG. 2 is an overall schematic structural diagram of another beam scanning apparatus with arrayed rotating mirrors according to an embodiment of this application.

As shown in FIG. 2, in the beam scanning apparatus with arrayed rotating mirrors in this embodiment of this application, an angle encoder (7) is further disposed on the bearings (6a and 6b), and the angle encoder (7) is configured to obtain azimuth information of the rotating mirror (5). This ensures precision of a beam scanning deflection angle of the rotating mirror (5), and also effectively improves beam scanning stability of the rotating mirror (5). Specifically, the angle encoder (7) is disposed on the bearing (6a or 6b).

Further, the mounting rack (4) includes a base (8), a slab (12) that is parallel to the base (8), and a column (13) that connects the base (8) and the slab (12), the slab (12) is parallel to an upper surface of the base (8), and the motor (1), the worm (2), and the wormgear (3) are all disposed on an upper surface of the slab (12).

Further, with reference to the beam scanning apparatus with arrayed rotating mirrors, in another implementation of this application, the beam scanning apparatus with arrayed rotating mirrors further includes a coupling (10), where the motor (1) is coaxially connected to the worm (2) by using the coupling (10).

The base (8) is disposed at a bottom part of the beam scanning apparatus with arrayed rotating mirrors, and the mounting rack (4) is configured to support other parts of the beam scanning apparatus with arrayed rotating mirrors. The column (13) is configured to support the slab (12). The rotating mirror (5) and a power supply (9) are disposed between the slab (12) and the base (8).

The two ends of the rotating mirror portion (5c) are respectively connected to the rotating mirror base (5a) and the rotating mirror base (5b). The bearing (6a) penetrates through a plane in which the slab (12) is located, the rotating mirror (5) is coaxially connected to the wormgear (3) by using the bearing (6a), the motor (1) is coaxially connected to the worm (2), and transmission between the worm (2) and the wormgear (3) is achieved through engagement with the gear (11). The rotating mirror base (5b) is connected to the base (8) by using the bearing (6b), a groove is provided on the upper surface of the base (8), the bearing (6b) is fastened in the groove on the base (8), mirror planes of the rotating mirrors (5) are arranged in a same orientation and rotate synchronously, and there is a gap of approximately 0.2 mm between adjacent sets of rotating mirrors (5), so that the rotating mirrors (5) do not collide with each other during rotation. The angle encoder (7) is further disposed on the bearing (6a or 6b), and the angle encoder (7) is configured to obtain the azimuth information of the rotating mirror (5).

The rotating mirrors (5) are arranged in a horizontal direction in one dimension, and are kept at a same height. The rotating mirrors (5) are reflecting mirrors, and reflecting planes are all plated with reflective film. There is an interval of approximately 0.2 mm between adjacent rotating mirrors (5), to keep the adjacent rotating mirrors (5) from colliding with each other in a rotation process.

Beneficial effects are as follows: In the beam scanning apparatus with arrayed rotating mirrors in this application, the reflecting mirror is used as the rotating mirror (5), and a scanning mirror of the beam scanning apparatus is disposed as a plurality of rotating sub-mirrors, namely, a plurality of rotating mirrors (5), to form a transmission structure in which the plurality of rotating mirrors (5) operate in a linkage manner. In addition, the beam scanning apparatus with arrayed rotating mirrors is disposed accordingly. This achieves features such as a high scanning speed, a large angle of view, high precision, and a simple structure at the same time. Therefore, the beam scanning apparatus with arrayed rotating mirrors is especially suitable for a lidar system having requirements on low costs and miniaturization. A scanning angle of the beam scanning apparatus with arrayed rotating mirrors can reach at least 60°. When the rotating mirror (5) is a dual-plane-parallel reflecting mirror, the scanning angle can reach at least 100 degrees, effectively increasing a beam scanning range. In this application, the angle encoder (7) is further disposed on the bearing (6a or 6b), and the angle encoder (7) is configured to obtain the azimuth information of the rotating mirror (5). This ensures precision of a beam scanning deflection angle of the rotating mirror (5), and also effectively improves beam scanning stability of the rotating mirror (5).

In this embodiment of this application, the scanning mirror of the beam scanning apparatus is disposed as the plurality of rotating sub-mirrors, namely, the plurality of rotating mirrors (5), to form the transmission structure in which the plurality of rotating mirrors (5) operate in a linkage manner. In addition, the beam scanning apparatus is disposed accordingly, to fully improve space utilization of the entire system and reduce power consumption and noise. This greatly reduces a volume of the beam scanning apparatus. Therefore, this apparatus has outstanding features such as a large scanning angle of view, high precision, a small volume, high extensibility, and low costs. A product has an outstanding advantage in the small volume over mainstream products on the market.

Figure 3:
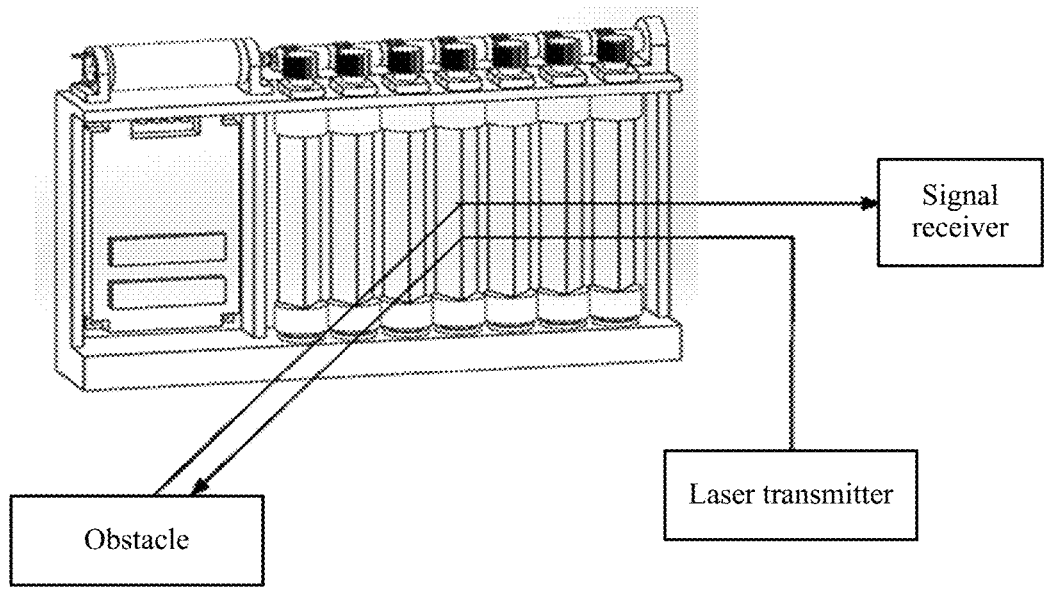
FIG. 3 is a schematic diagram of a working principle of a beam scanning apparatus with arrayed rotating mirrors according to an embodiment of this application.

FIG. 3 shows a working principle of the beam scanning apparatus with arrayed rotating mirrors. The laser transmitter transmits a laser to the rotating mirror (5), the rotating mirror (5) reflects or refracts the laser to an obstacle in a scenario that needs to be scanned, and then the rotating mirror (5) receives a laser reflected back by an object in the scanned scenario, and reflects or refracts, to a signal receiver, the laser reflected back by the object. The angle encoder (7) can record and control an angle and a rotational speed of each set of rotating mirror, to improve beam scanning stability of the rotating mirror (5) and ensure the precision of the beam scanning deflection angle.

Figure 4:
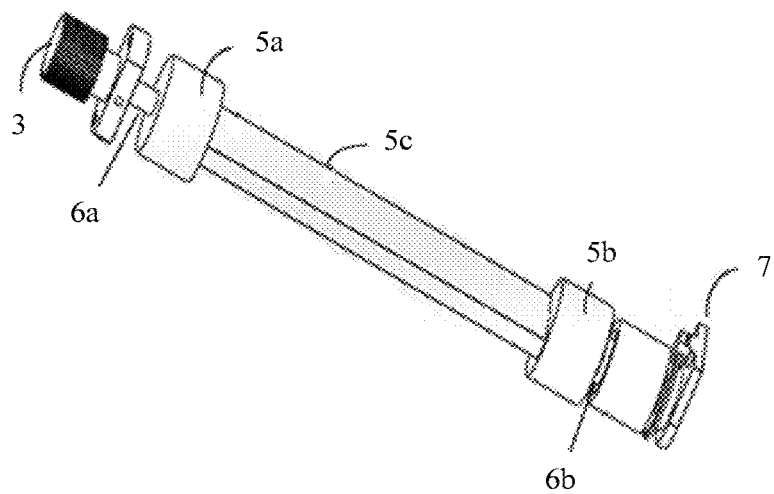
FIG. 4 is a schematic structural diagram of a single set of rotating mirror in a beam scanning apparatus with arrayed rotating mirrors according to an embodiment of this application.

As shown in FIG. 4, the two ends of the rotating mirror portion (5c) are respectively connected to the two rotating mirror bases (5a and 5b). The rotating mirror base (5a) is coaxially connected to the wormgear (3), the rotating mirror base 5b is connected to the base (8) by using the bearing 6, and the bearing 6b is fastened in the groove on the base (8). The angle encoder (7) is disposed on the bearing (6a or 6b), to ensure precision of a rotation angle of the rotating mirror (5). Each rotating mirror (5) may be detected, installed, commissioned, repaired, disassembled, and replaced independently, so that the apparatus is maintained more conveniently and has higher extensibility.

Figure 5:
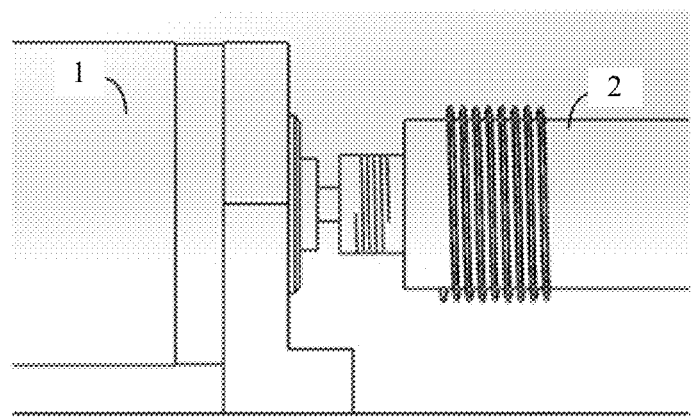
FIG. 5 is a schematic diagram of connection between a motor and a worm in a beam scanning apparatus with arrayed rotating mirrors according to an embodiment of this application.

As shown in FIG. 5, the motor (1) is coaxially connected to the worm (2) by using the coupling, to drive the worm (2) to rotate in a circle. The worm (2) always moves in a circle, ensuring a stable rotational speed of the rotating mirror (5), and also efficiently improving beam scanning efficiency.

Figure 6:
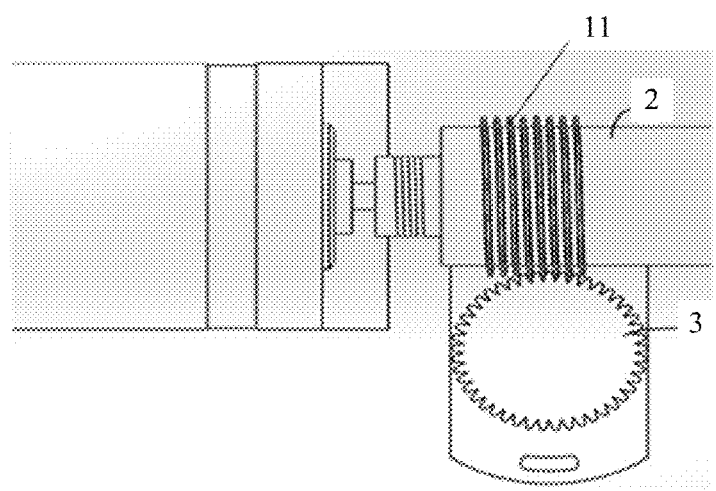
FIG. 6 is a schematic diagram of transmission between a worm and a wormgear in a beam scanning apparatus with arrayed rotating mirrors according to an embodiment of this application.

As shown in FIG. 6, a rotation axis of the worm (2) and a rotation axis of the wormgear (3) are perpendicular to each other, the worm (2) and the wormgear (3) engage with each other by using the gear (11), and the worm (2) drives the wormgears (3) to operate in a linkage manner. A manner of transmission between the worm (2) and the wormgear (3) achieves features such as a compact structure, high precision, a small vibratory shock, and a long life. During installation, first a steering angle of the wormgears (3) is adjusted, to ensure that initial orientations of all sets of rotating mirrors (5) are consistent. Then, the worm (2) is installed and engages with each set of wormgear (3) by using the gear. Therefore, the sets of rotating mirrors (5) can operate in a linkage manner with high precision when driven by the motor (1), to ensure a uniform beam deflection direction.

Figure 7:
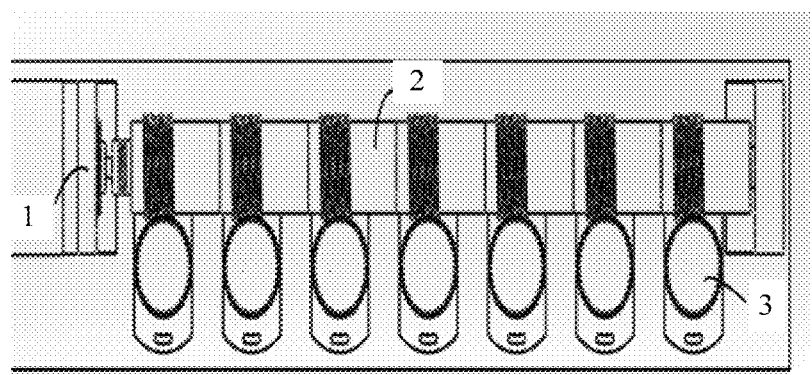
FIG. 7 is a schematic diagram of a worm synchronously driving wormgears in a beam scanning apparatus with arrayed rotating mirrors according to an embodiment of this application.

FIG. 7 is a schematic diagram of the worm (2) synchronously driving the wormgears (3). The rotation axis of the worm (2) and the rotation axis of the wormgear (3) are perpendicular to each other, the worm (2) and the wormgear (3) engage with each other by using the gear, and the worm (2) drives the wormgears (3) to operate in a linkage manner.

Figure 8:
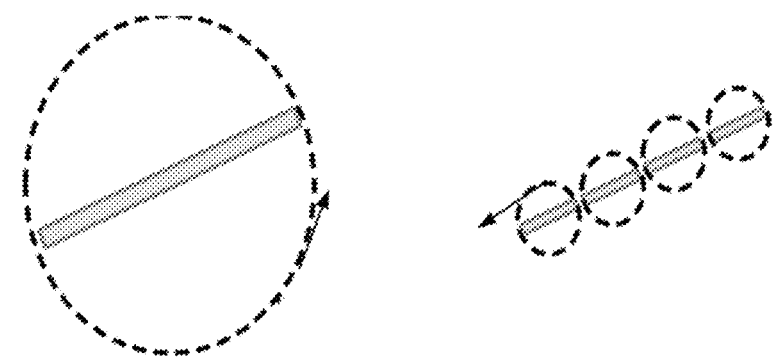
FIG. 8 is a top view of a rotating mirror in a beam scanning apparatus with arrayed rotating mirrors according to an embodiment of this application.

As shown in FIG. 8, a right part of FIG. 8 is a top view of the rotating mirrors (5) in the beam scanning apparatus with arrayed rotating mirrors according to this embodiment of this application. A rotation direction of the rotating mirrors is indicated by an arrow. The arrayed rotating mirrors (5) shown in the right part of FIG. 8 is obtained through improvement based on a rotating mirror shown in a left part of FIG. 8. As shown in the right part of FIG. 8, in the beam scanning apparatus with arrayed rotating mirrors according to this embodiment of this application, a rotational radius of each rotating mirror (5) is reduced. In this way, for a same scanning angle, this can greatly reduce a volume and power consumption of a scanning part, and the volume and the power consumption are reduced to ⅓ of those in the prior art. In this embodiment of this application, a rotating mirror is decomposed into a plurality of rotating sub-mirrors, namely, a plurality of rotating mirrors (5), to form a transmission structure in which the plurality of rotating mirrors (5) operate in a linkage manner. In addition, another part of the beam scanning apparatus is disposed accordingly relative to the rotating mirrors (5), to effectively improve space utilization of the entire system and reduce the power consumption and noise. This greatly reduces the volume of the beam scanning apparatus, so that the apparatus occupies less space and the product has an outstanding advantage in the small volume over mainstream products on the market.

This application features good extensibility. An angle of view and a scanning frequency for beam scanning may be determined based on a structure parameter of the rotating mirror (5), and a suitable rotating mirror (5) is equipped according to an actual purpose. Common types of reflecting mirrors that can be used as the rotating mirror (5) include a dual-plane-parallel reflecting mirror, a triple-plane-parallel reflecting mirror, a dual-plane pyramid reflecting mirror, and the like. In a working state in which a rotational speed of the motor (1) is 20 Hz, a transmission ratio between the worm (2) and the wormgear (3) is 1. It is learned through experimental tests that the foregoing three types of reflecting mirrors achieve good working performance. Output results are shown in the following table:

| | Dual-plane-parallel reflecting mirror | Triple-plane-parallel reflecting mirror | Dual-plane pyramid reflecting mirror |
|---|---|---|---|
| Scanning angle | At least 100° | Approximately 60° | At least 100° |
| Scanning frequency | 40 Hz | 60 Hz | 40 Hz |
| Remarks | | | Three-dimensional spatial scanning can be performed |

Figure 9:
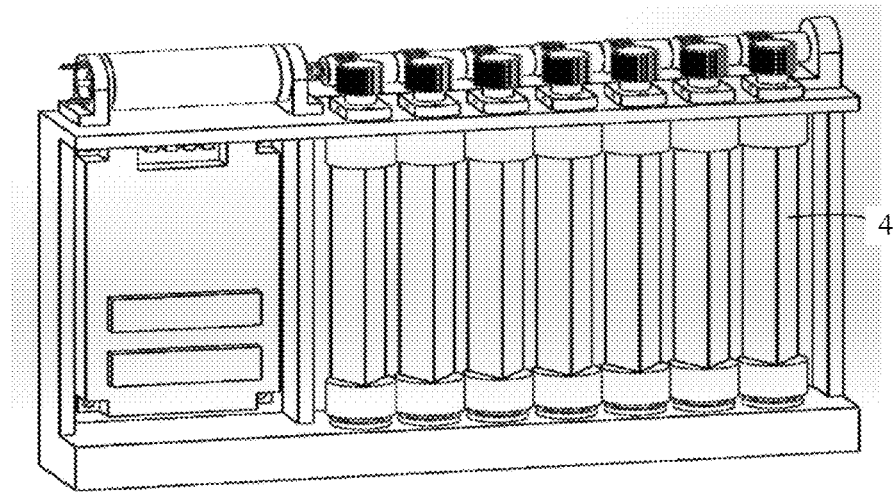
FIG. 9 is another schematic structural diagram of a rotating mirror in a beam scanning apparatus with arrayed rotating mirrors according to an embodiment of this application.

FIG. 9 is a schematic diagram of a beam scanning apparatus in which triple-plane-parallel reflecting mirrors are used as the rotating mirrors (5). FIG. 9 differs from FIG. 1 in the rotating mirrors (5), where the triple-plane-parallel reflecting mirrors are used, structures of other mechanical parts basically remain unchanged, a scanning frequency is 60 Hz, and a scanning angle can reach approximately 60°.

Figure 10:
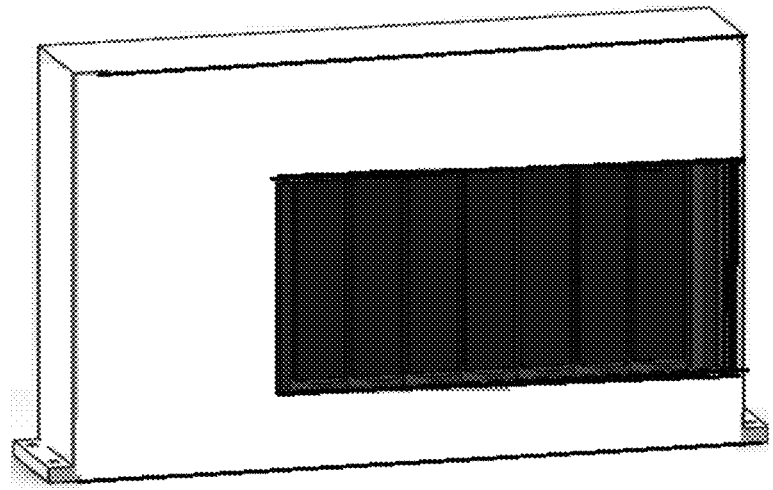
FIG. 10 is a schematic structural diagram of packaged rotating mirrors in a beam scanning apparatus with arrayed rotating mirrors according to an embodiment of this application.

FIG. 10 is a schematic structural diagram of packaged rotating mirrors in a beam scanning apparatus with arrayed rotating mirrors according to an embodiment of this application. In the beam scanning apparatus according to this embodiment of this application, arrayed rotating mirrors are used to replace a conventional large-sized rotating mirror, to greatly reduce a volume, noise, and power consumption of a beam scanning system. A rotating part can be hidden after packaging. In this embodiment of this application, the rotating mirrors (5) or the entire beam scanning apparatus with arrayed rotating mirrors is packaged, so that a mechanical rotating part can be hidden and stays in a static state from appearance. Therefore, the beam scanning apparatus is very suitable for a hybrid solid-state lidar for a self-driving vehicle or an intelligent robot. In this embodiment of this application, a mature technology is used, and an inexpensive component is used. Therefore, mass production can be smoothly implemented under current conditions, offering outstanding advantages in market popularization and promotion. In conclusion, compared with a conventional beam scanning technology, a solution in this embodiment of this application has outstanding advantages such as a large scanning angle of view, high precision, a small volume, high extensibility, and low costs.

Figure 11:
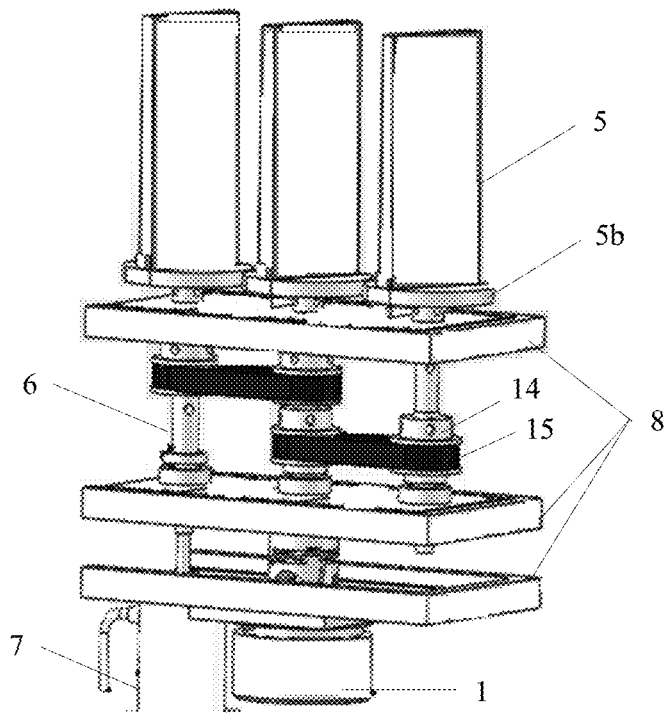
FIG. 11 is a schematic structural diagram of another beam scanning apparatus with arrayed rotating mirrors according to an embodiment of this application.

FIG. 11 shows a beam scanning apparatus with arrayed rotating mirrors according to another implementation of an embodiment of this application. The beam scanning apparatus with arrayed rotating mirrors includes a motor (1), at least one set of rotating mirror (5), a rotating mirror base (5b), at least one set of bearing (6), an angle encoder (7), a synchronous pulley (14), a synchronous belt (15), and a base (8).

The motor (1) is coaxial with the one set of bearing (6) and drives the one set of bearing (6) to rotate, the synchronous pulley (14) is disposed on each set of bearing (6), and the bearings (6) are connected by using the synchronous belt (15), so that the sets of bearings (6) rotate synchronously.

One rotating mirror base (5b) is disposed on one end of each set of rotating mirror (5), and the rotating mirror base (5b) is connected to one set of bearing (6), so that the sets of bearings (6) respectively drive the sets of rotating mirrors (5) to rotate.

The base (8) is disposed between the motor (1) and the rotating mirror base (5b), and an opening is provided on the base (8), so that each set of bearing (6) is embedded in the base (8).

The angle encoder (7) is disposed on one of the sets of bearings (6).

In another implementation of this application, the angle encoder (7) is disposed on each set of bearing (6), and the angle encoder (7) is configured to obtain azimuth information of each set of rotating mirror (5), so that the sets of rotating mirrors (5) precisely operate in a linkage manner. In another embodiment, there are at least two sets of rotating mirrors (5).

Beneficial effects are as follows: In this embodiment of this application, a reflecting mirror is used as the rotating mirror (5), and the rotating mirror is decomposed into a plurality of sub-mirrors, namely, the arrayed rotating mirrors (5), to form a transmission structure in which the plurality of rotating mirrors (5) operate in a linkage manner. In addition, a structure of another part of the beam scanning apparatus is disposed accordingly relative to the rotating mirrors (5). This achieves features such as a high scanning speed, a large angle of view, high precision, and a simple structure at the same time. Therefore, the beam scanning apparatus with arrayed rotating mirrors is especially suitable for a lidar system having requirements on low costs and miniaturization. A scanning angle of the apparatus can reach at least 60° or at least 100°, thereby effectively increasing a beam scanning range. In this embodiment of this application, the angle encoder (7) is disposed on the rotating mirror (5). This ensures precision of a beam scanning deflection angle, and also effectively improves beam scanning stability of mirror planes. The rotating mirror (5) that is used can be independently detected, installed, commissioned, repaired, disassembled, or replaced. When the rotating mirror (5) is replaced, an angle of view and a scanning frequency of the beam scanning apparatus with arrayed rotating mirrors can be changed and one-dimensional scanning can even be extended to two-dimensional scanning, featuring high extensibility.

In this embodiment of this application, a structure of the beam scanning apparatus with arrayed rotating mirrors is disposed. This overcomes disadvantages such as an excessively small scanning angle, a low response speed, high costs, a large volume, and high power consumption of a beam scanning apparatus in the prior art, and achieves effects such as a high scanning speed, a large angle of view, high precision, a simple structure, a small volume, and low power consumption at the same time. Therefore, the beam scanning apparatus with arrayed rotating mirrors is especially suitable for a lidar system having requirements on low costs and miniaturization.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam scanning apparatus with arrayed rotating mirrors, comprising:
    a motor, a worm, a wormgear, a mounting rack, at least two sets of rotating mirrors and an angle encoder, wherein
    the worm and the wormgear are located on the mounting rack, and engage with each other by using a gear for a linkage connection;
    the sets of rotating mirrors are located in the mounting rack, and each rotating mirror is coaxially connected to one corresponding wormgear, the sets of rotating mirrors rotate synchronously;
    the motor is configured to drive the worm to rotate, to drive the wormgear and the rotating mirrors to rotate coaxially;
    each rotating mirror comprises (a) a rotating mirror portion comprising a reflecting mirror and (b) rotating mirror bases that are respectively connected to two ends of the rotating mirror portion, bearings that are rotatably connected to the mounting rack are respectively disposed on the two rotating mirror bases and extend outward from two ends of the rotating mirror, and one of the bearings is coaxially connected to the corresponding wormgear; and
    the angle encoder is disposed on one of the bearings and configured to obtain azimuth information of the sets of rotating mirrors.

2. The beam scanning apparatus with arrayed rotating mirrors according to claim 1, wherein
    mirror planes of the sets of rotating mirrors are arranged in a same orientation, and the sets of rotating mirrors rotate synchronously.

3. The beam scanning apparatus with arrayed rotating mirrors according to claim 2, wherein the reflecting mirror is one of the following:
    a dual-plane-parallel reflecting mirror, a triple-plane-parallel reflecting mirror, or
    a dual-plane pyramid reflecting mirror.

4. The beam scanning apparatus with arrayed rotating mirrors according to claim 3, wherein angle encoders are further disposed on the sets of bearings, and the angle encoders are configured to obtain azimuth information of the sets of rotating mirrors, so that the sets of rotating mirrors precisely operate in a linkage manner.

5. The beam scanning apparatus with arrayed rotating mirrors according to claim 4, wherein
    axial directions of the sets of rotating mirrors are perpendicular to an upper surface of a base, and
    the sets of rotating mirrors are arranged at a same height, relative to the upper surface of the base, along the axial direction of the rotating mirrors.

6. The beam scanning apparatus with arrayed rotating mirrors according to claim 2, wherein
    the mounting rack comprises a base, a slab that is parallel to the base, and a column that connects the base and the slab, the slab is parallel to an upper surface of the base, and the motor, the worm, and the wormgear are all disposed on an upper surface of the slab.

7. The beam scanning apparatus with arrayed rotating mirrors according to claim 6, further comprising a power supply, wherein the power supply is configured to supply power to the motor, and the power supply is disposed on the upper surface of the base.

8. The beam scanning apparatus with arrayed rotating mirrors according to claim 2, further comprising a coupling, wherein the motor is coaxially connected to the worm by using the coupling.

9. The beam scanning apparatus with arrayed rotating mirrors according to claim 2, wherein a parameter of one set of rotating mirrors is the same as that of the rest sets of rotating mirrors.

10. The beam scanning apparatus with arrayed rotating mirrors according to claim 2, wherein a groove is provided on the base, and the bearing is disposed in the groove on the base.

11. The beam scanning apparatus with arrayed rotating mirrors according to claim 2, wherein the mirror plane of each set of rotating mirrors is plated with reflective film.

12. The beam scanning apparatus with arrayed rotating mirrors according to claim 1, wherein the mirror planes of each set of rotating mirrors are plated with reflective film.

13. The beam scanning apparatus with arrayed rotating mirrors according to claim 1, wherein a groove is provided on a base, and the bearing is disposed in the groove on the base.

14. A beam scanning apparatus with arrayed rotating mirrors, comprising:
    a motor, at least one set of rotating mirror, a rotating mirror base, at least one set of bearing, an angle encoder, a base, a synchronous pulley, and a synchronous belt, wherein
    the motor is coaxial with the one set of bearing and drives the one set of bearing to rotate, the synchronous pulley is disposed on each set of bearing, and the bearings are connected by using the synchronous belt, so that the sets of bearings rotate synchronously;
    one rotating mirror base is disposed on one end of each set of rotating mirror, and the rotating mirror base is connected to one set of bearing, so that the sets of bearings respectively drive the at least one set of rotating mirror to rotate;
    the base is disposed between the motor and the rotating mirror base, and an opening is provided on the base, so that each set of bearing is embedded in the base; and
    the angle encoder is disposed on one of the sets of bearings.

15. The beam scanning apparatus with arrayed rotating mirrors according to claim 14, further comprising: at least two sets of rotating mirrors.

\* \* \* \* \*